3,452,059
SULFUR-CONTAINING ANILIDE COMPOUNDS
AND METHODS FOR THEIR PRODUCTION
Edward Faith Elslager and Donald Francis Worth, Ann Arbor, Mich., assignors to Parke, Davis & Company, Detroit, Mich., a corporation of Michigan
No Drawing. Filed Nov. 15, 1966, Ser. No. 594,394
Int. Cl. C07c *147/00, 149/32;* A61k *27/00*
U.S. Cl. 260—397.6          3 Claims

ABSTRACT OF THE DISCLOSURE

4'-(N-benzylidenesulfanilyl)formanilides and 4'-(N-benzylidenesulfanilyl)acetanilides, in which the N-benzylidene group is optionally substituted by p-acetamido; salts thereof; and their production by (1) reacting 4'-sulfanilylformanilide or 4'-sulfanilylacetanilide with benzyladehyde or p-acetamidobenzaldehyde, and (2) reacting N-benzylidene-4,4'-sulfonyldianiline or N-(p-acetamidobenzylidene)-4,4'-sulfonyldianiline with formic acid, acetic acid, or reactive derivatives thereof. The compounds of the invention are useful as antimalarial and antileprosy agents that exhibit long duration of action.

SUMMARY AND DETAILED DESCRIPTION

The present invention relates to new sulfur-containing anilide compounds and to methods for their production. More particularly, the invention relates to new 4'-(N-benzylidenesulfanilyl)anilide compounds having the formula,

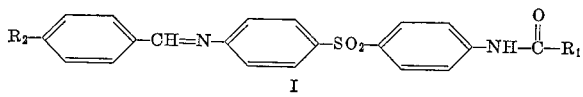

I and to salts thereof; where $R_1$ is hydrogen or methyl, and $R_2$ is hydrogen or an acetamido group.

In accordance with the invention, 4'-(N-benzylidenesulfanilyl)anilide compounds having the foregoing formula are produced by reacting a 4'-sulfanilylanilide compound having the formula,

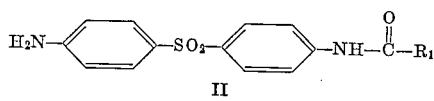

II with a benzaldehyde compound having the formula,

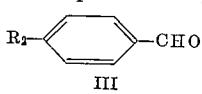

III in an unreactive solvent medium; where $R_1$ and $R_2$ have the aforementioned significance. Suitable unreactive solvents for use in the reaction are lower alkanols, such as methanol, ethanol, isopropyl alcohol, and isoamyl alcohol; glycols, such as ethylene glycol and propylene glycol; lower alkanoic acids, such as acetic acid and propionic acid; ethers, such as dioxane, ethylene glycol monomethyl ether, and ethylene glycol dimethyl ether; tertiary amides, such as N,N-dimethylacetamide and N,N-dimethylformamide; and dimethylsulfoxide; as well as mixtures of these. Preferred solvents are lower alkanols, ethylene glycol ethers, and lower alkanoic acids. Although the reaction can be carried out in the presence of a catalytic amount of acid and small amounts of water, best results are obtained when the reaction is carried out under essentially neutral, anhydrous conditions. The reaction is favored by temperatures in excess of 40° C., and is preferably carried out at a temperature between 60° and 150° C. The duration of the reaction is not critical and may be varied widely, from 30 minutes to 10 hours and longer. Although equivalent quantities of reactants may be employed, it is preferably to employ a substantial excess of the benzaldehyde reactant of Formula III to insure complete reaction. At the conclusion of the reaction, the reaction product normally precipitates from the reaction mixture and is isolated by filtration. In those instances when the product remains in solution, it may be isolated by concentrating the solution or by adding a suitable precipitant, such as an aliphatic ether or petroleum ether, and then collecting the precipitate by filtration. Special care should be taken to avoid contacting the reaction product with aqueous acid because it is readily decomposed in an acidic aqueous medium.

Also in accordance with the invention, compounds having Formula I above are produced by reacting an N-benzylidene-4,4'-sulfonyldianiline compound having the formula,

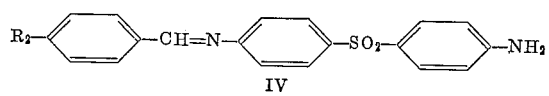

IV with a carboxylic acid having the formula $$R_1COOH \qquad (V)$$

or a reactive derivative thereof in an unreactive solvent medium; where $R_1$ and $R_2$ are as previously defined. For the preparation of the compounds of Formula I wherein $R_1$ is hyrogen, formic acid is used in this reaction, whereas for the preparation of the compounds wherein $R_1$ is methyl, a reactive derivative of acetic acid, such as acetic anhydride or an acetyl halide, is used. Acetic anhydride is preferred over an acetyl halide. When an acetyl halide, which is preferably acetyl chloride, is used, it is necessary to add to the reaction mixture a tertiary amine, such as pyridine or triethylamine, in an amount sufficient to bind the hydrohalic acid that is liberated in the reaction. Suitable solvents that may be used include ethers, such as 1,2-dimethoxyethane, diethylene glycol dimethyl ether, dioxane, and tetrahydrofuran; aromatic hydrocarbons, such as benzene, toluene, and xylene; chlorinated hydrocarbons, such as chlorobenzene, trichloroethane, carbon tetrachloride, and chloroform; and other unreactive solvents such as N,N-dimethylformamide and dimethylsulfoxide. In the reaction with an acetyl halide, an excess of teritiary amine may be used and additional solvent may be omitted. In the reaction with acetic anhydride, glacial acetic acid may also be used as solvent, but added solvent may be omitted entirely if a several-fold excess of the anhydride is used. The temperature of the reaction is not critical and may be varied widely, from 0° to 150° C. The duration of the reaction is likewise not critical and may be varied from one to 24 hours and longer. Preferred conditions are a temperature between 75° and 110° C. and a period from one to 4 hours. Equivalent amounts of reactants may be employed; to insure complete reaction, however, it is preferable to use an excess of the carboxylic acid or reactive derivative thereof.

The N-benzylidene-4,4'-sulfonyldianiline compound used as starting material in the foregoing procedure is prepared by reacting 4,4'-sulfonyldianiline with one equivalent of a benzaldehyde compound having Formula III above.

The compounds of the invention having Formula I can, under certain conditions, form salts by reaction with a strong acid, such as a mineral acid. These salts, however, are difficult to isolate and are not very stable under normal conditions. For these reasons the free compounds represented by Formula I are highly preferred over the salts. Except in the respect noted above, however, the salts and free compounds are otherwise equivalent.

The compounds of the invention are new chemical compounds that are of value as pharmacological agents. They are antimalarial and antileprosy agents that exhibit long duration of action. It is known that 4,4'-sulfonyldianiline is an effective antimalarial and antileprosy drug. To obtain the desired effects with this drug, however, frequent dosing, as often as once a week, is necessary. For large-scale malaria eradication programs or for mass leprosy treatment, it is impractical to administer a drug on such a frequent schedule. Furthermore, average or large doses of 4,4'-sulfonyldianiline may cause any of a number of toxic side effects. In contrast, the compounds of the present invention, while possessing the high activity of 4,4'-sulfonyldianiline, exhibit long duration of action, thereby making it possible to extend the dosage interval from one week to as long as several months, and are well-tolerated, both locally and systemically. The compounds of the invention can be formulated into suspensions that are pharmaceutically acceptable for intramuscular injection, using suspending vehicles such as 40% benzyl benzoate and 60% castor oil, or water containing emulsifying or dispersing agents.

The invention is illustrated by the following examples.

Example 1

A mixture consisting of 2.9 g. of 4'-sulfanilylacetanilide, 2.1 g. of benzaldehyde, and 200 ml. of ethanol is heated under reflux for 4 hours, concentrated to half-volume, and cooled. The solid 4'-(N-benzylidenesulfanilyl)acetanilide that precipitates is isolated, crystallized from ethanol and dried at 65° C. in vacuo; M.P. 240–242° C.

By utilizing the foregoing procedure, with the substitution of 2.7 g. of 4'-sulfanilylformanilide for the 4'-sulfanilylacetanilide, there is obtained 4'-(N-benzylidenesulfanilyl)formanilide; M.P. 229–232° C., following crystallization from ethanol.

Example 2

A mixture consisting of 7.25 g. of 4'-sulfanilylacetanilide, 8.16 g. of p-acetamidobenzaldehyde, and 500 ml. of isoamyl alcohol is distilled at atmospheric pressure until the volume is reduced to about 50 ml. The resulting solution is then further evaporated under reduced pressure to near-dryness, and the residue, upon cooling, is triturated with isopropyl alcohol. The solid precipitate of 4'-[N - (p - acetamidobenzylidene)sulfanilyl]acetanilide that is obtained is isolated, dried, and crystallized from acetone-ether; M.P. 233–237° C.

Example 3

A mixture consisting of 3.36 g. of N-benzylidene-4,4'-sulfonyldianiline, 1.02 g. of acetic anhydride, and 100 ml. of N,N-dimethylformamide is heated on a steam bath for 2 hours, cooled to room temperature, and treated with an equal volume of diethyl ether. The solid 4'-(N-benzylidenesulfanilyl)acetanilide that precipitates is isolated and crystallized from ethanol; M.P. 240–242° C.

Utilizing the foregoing procedure, the following 4'-(N-benzylidenesulfanilyl)anilide compounds are prepared from the reaction of the designated N-benzylidene-4,4'-sulfonyldianiline compound with the designated carboxylic acid reactant.

(a) From the reaction of 3.36 g. of N-benzylidene-4,4'-sulfonyldianiline with 0.5 g. of formic acid there is obtained 4'-(N-bnezylidenesulfanilyl)formanilide; M.P. 229–232° C.

(b) From the reaction of 3.9 g. of N-(p-acetamidobenzylidene)-4,4'-sulfonyldianiline with 1.02 g. of acetic anhydride there is obtained 4'-[N-(p-acetamidobenzylidene)sulfanilyl]acetanilide; M.P. 233–237° C.

We claim:

1. A 4' - (N-benzylidenesulfanilyl)anilide compound having the formula,

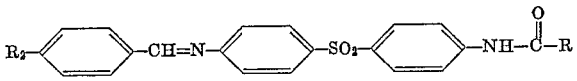

where $R_1$ is a member of the class consisting of hydrogen and methyl, and $R_2$ is a member of the class consisting of hydrogen and acetamido.

2. 4'-(N-benzylidenesulfanilyl)acetanilide.

3. 4' - [N-(p-acetamidobenzylidene)sulfanilyl]acetanilide.

References Cited

UNITED STATES PATENTS 2,336,501   12/1943   Raiziss _____ 260—397.6
2,325,344   7/1943    Shoule et al. _____ 260—397.6

FOREIGN PATENTS 579,001   7/1943   Great Britain.

HENRY R. JILES, *Primary Examiner.*

HARRY T. MOATZ, *Assistant Examiner.*

U.S. Cl. X.R.

260—999